US006785332B1

United States Patent
Kutter et al.

(10) Patent No.: US 6,785,332 B1
(45) Date of Patent: Aug. 31, 2004

(54) METHOD FOR MARKING A COMPRESSED DIGITAL VIDEO SIGNAL

(75) Inventors: Martin Kutter, Corseaux (CH); Frédéric Jordan, Les Paccots (CH); Touradj Ebrahimi, Pully (CH)

(73) Assignee: Ecole Polytechnique Federale de Lausanne, Lausanne (CH)

( * ) Notice: Subject to any disclaimer, the term of this patent is extended or adjusted under 35 U.S.C. 154(b) by 0 days.

(21) Appl. No.: 09/463,053

(22) PCT Filed: Jul. 15, 1998

(86) PCT No.: PCT/CH98/00310

§ 371 (c)(1),
(2), (4) Date: Jan. 18, 2000

(87) PCT Pub. No.: WO99/04570

PCT Pub. Date: Jan. 28, 1999

(30) Foreign Application Priority Data

Jul. 18, 1997 (CH) .............................................. 1765/97

(51) Int. Cl.⁷ ............................. H04N 7/12; H04N 7/00; G06K 9/36
(52) U.S. Cl. .................... 375/240.16; 382/251; 348/461
(58) Field of Search ....................... 375/240.15, 240.16, 375/240, 240.24, 240.01; 348/598, 699, 461, 465, 467, 473; 380/54, 212; H04N 7/26; G11B 20/00

(56) References Cited

U.S. PATENT DOCUMENTS

| 3,885,217 A | * | 5/1975 | Cintron ....................... 348/473 |
| 4,368,486 A | * | 1/1983 | Degoulet et al. ........... 348/598 |
| 5,206,906 A | * | 4/1993 | McNair ....................... 380/212 |
| 5,778,102 A | * | 7/1998 | Sandford et al. ........... 382/251 |
| 5,960,081 A | * | 9/1999 | Vynne et al. ................ 348/461 |

FOREIGN PATENT DOCUMENTS

| AU | 0-8186-6950-0/94 | * | 11/1994 | ............ H04N/7/26 |
| EP | 0 762 417 A2 | * | 3/1997 | ........... G11B/20/00 |

* cited by examiner

*Primary Examiner*—Gims Philippe
(74) *Attorney, Agent, or Firm*—Clifford W. Browning; Woodard, Emhardt, Moriarty, McNett & Henry LLP

(57) ABSTRACT

A method for marking a compressed digital video signal by embedding a digital signature in the compressed video signal, the signal representing a series of at least two video images, each image being divided into a plurality of regions, the signal including movement vectors representing the movement of the regions between the first and the second image, characterised in that it consists in modifying at least one of the coefficients X or Y of at least one of the movement vectors.

21 Claims, 1 Drawing Sheet

METHOD FOR MARKING A COMPRESSED DIGITAL VIDEO SIGNAL

TECHNICAL FIELD

Figure 1:
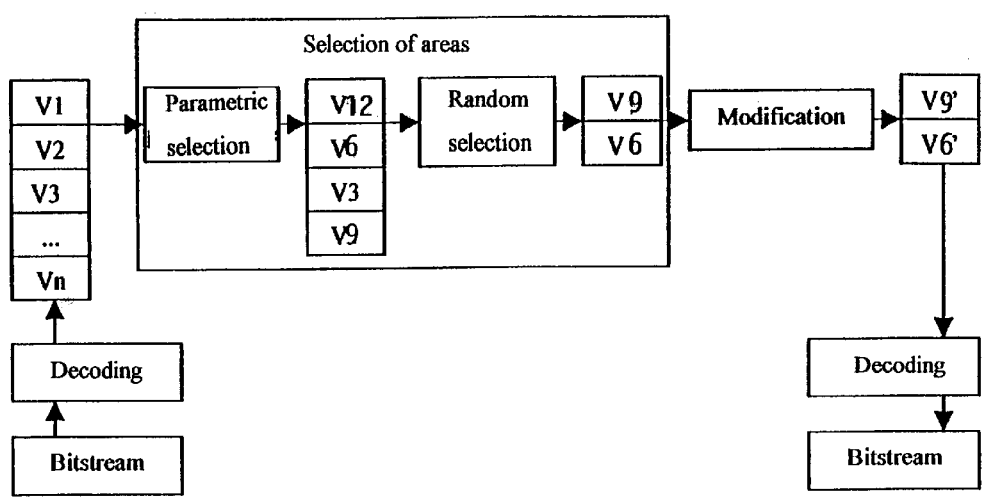

This invention concerns marking of video signals and in particular a method for marking a compressed digital video signal by incorporating a digital signature embedded in the video signal.

The options available for transmitting images via new media such as the Internet and satellite television mean that the volume of data exchanged, especially video images, will continue to increase.

In parallel, recent developments in the television and digital video sector not only afford an appreciable improvement in image quality but also enable copies of quality identical to the original to be made, such that the copy is indistinguishable from the original.

This is why research has been undertaken with a view to enabling absolute identification of the author of a video image, to enable him to enforce his rights with regard to unauthorised broadcasters.

Prior Art

Methods are known for the protection of video images consisting in incorporating a digital signal by slightly modifying the data in order to be able to identify the said signature. This signature may then be used to identify the author of the image. Two main signature techniques have been used to date. The simplest entails modulating the brightness of a pixel selected pseudo-randomly. This technique is used in particular for grey scale images and is described in particular in the article by R. G. van Schnydel et al. (<<Digital watermark>>, *Proceedings of the 1994 1st IEEE International Conference on Image Processing*, Vol. 2, pp. 86–90, 1994).

More complex techniques have also been proposed in which the image is divided into blocks with amplitude modulation and block size that are in turn modulated by local energy. Techniques suitable for black and white images have been proposed by K. Matsui et al. (<<How to secretly imbed a signature on a picture,>> *The Journal of the interactive Multimedia Association Intellectual Property Project*, Vol. 1, No. 1, pp. 187–206, January 1994). In the article by W. Bender et al. (<<Techniques for Data Hiding)>>, *Proceedings of the SPIE*, 2420:40, February 1995), the difference between the brightness value of pixels is used. Whilst this latter article proposes duplication of textured areas and then use of an auto-correlation calculation, a technique very often used is modification of the DCT coefficients generated by JPEG encoders (S. Burgeft et al. <<A Novel Method for Copyright Labelling Digitized Image Data>>, IEEE Transactions on Communications, September 1994) or MPEG-2. These two techniques are well suited to colour images or animated colour images respectively.

The number of bits generated by the images in the transmission of video information requires a high compression rate. In this field, the MPEG format has rapidly taken over and has become an international standard, with most professional equipment processing video signals in this format.

An identification technique specific to MPEG uses part of the compressed signal for information designed to identify the supplier, as well as a so-called protection bit, indicating that the image is protected and that copying is prohibited. However, these factors do not offer any security as it is very easy to delete them as their position is clearly defined in the MPEG standard.

As mentioned previously, this invention concerns a method for marking a compressed digital video signal by incorporating a digital signature embedded in the video signal.

This method is only of use if the signature cannot be deleted easily and if it can withstand handling such as compression and decompression, a zoom function and image shift, this signature obviously not altering the video signal other than imperceptibly.

It is known that the MPEG standard is based on analysis of the development in the various frames and transmission of the differences. It has been noted in particular that, from one image to another, a large amount of the information does not change, or is in a slightly different plane. To this effect the MPEG encoder breaks down the image into blocks, usually of 8 by 8 pixels, with comparisons then being made of these blocks. In particular, these operations concern DCT, DFD and motion vectors. The most recent versions of MPEG enable a set of blocks to be joined and operations then carried out on this set of blocks termed a region.

The DCT (Discrete Cosinus Transform) is a transformation into a Discrete Cosinus which enables amplitudes of the different frequencies forming an image to be obtained. Its advantage lies in the fact that it is then possible to selectively compress the different frequency bands in order to minimise the visual distortion. It is generally done on blocks of reduced size (typically 8×8). This transformation is applied to all the blocks forming the image. It is followed by a quantification and entropic coding stage.

The DFD (Displaced Frame Difference) represents the difference between the image predicted by the translational model and the actual image.

DCT coding is applied to transmit DFD type information.

Motion vectors are used when the same block is slightly offset from one frame to the next. In this case, the MPEG format provides indication that a block present in the preceding image reappears in the current image slightly offset in plane, by a value corresponding to the coefficients X and Y. This principle allows errors, i.e. if a small part of a new block recreated in this way is different, the motion vector will be accompanied by DFD data containing the differences between the displaced preceding block and the actual visual information of this new block.

Previous marking experiments used DCT coefficients to incorporated the signature in a compressed video signal. This technique is, however, highly susceptible to image framing alignment problems, and displacement of one or two pixels results in different DCT coefficients, which prevents extraction of the signature. This disadvantage is exacerbated further still in that certain video processing equipment causes offset by one pixel on the video signal produced.

SUMMARY OF THE INVENTION

The purpose of this invention is to offer a method for marking a compressed digital video signal by incorporating a signature embedded in the digital signal, which is robust, invisible and identifiable in real time.

To this effect the invention concerns a method for marking a compressed digital video signal by incorporating a digital signature embedded in the compressed video signal, the said signal representing a series of at least two video images, each of the images being divided into several regions, the said signal comprising motion vectors representing motion of the regions between the first and the second image, the method being characterised by the fact that at least one of the coefficients X or Y is modified on at least one of the said motion vectors, with a region possibly consisting of one block.

According to one embodiment, a set of motion vectors MV(i) is selected with a low visual impact, preferably a set of vectors with a standard lower than a threshold R, for example a threshold R equal to 5.

According to an initial variant, a set of vectors contained in a frame preceding a frame containing all the image information is selected (type I frame).

According to a second variant, the set of motion vectors MV(i) is changed according to a pseudo-random selection modulated by a code, the signature possibly comprising several bits S(i) and at least one of the said coefficients X or Y of the motion vectors possibly being modified according to at least one of the signature bits, with the method possibly also comprising the following steps:

generation of a random number A initialised by a parameter transmitted by the video signal, comprising the same number of bits as S;

modification of one of the coefficients X or Y such that this is signed with bit <<1>> if more than half the bits of A are identical to S or with bit <<0>> if the reverse applies.

The parameter initialising the random number may be a mathematical combination of the standard of the motion vector to be modified.

The coefficients X or Y of the motion vectors can be modified between the second and third frame in inverse proportion to the modification made between the The advantage of the method as per the invention is that it is highly robust, since only the special knowledge of the original video signal allows to identify the vectors which have been modified. As the image itself has been modified, further processing of this signal will not delete its signature.

The method essentially consists of two stages: selection of regions and modification of motion vectors.

DESCRIPTION OF THE METHOD

The description below is given as an example and refers to the drawing in which FIG. 1 is a diagram showing the steps of the method.

SELECTION OF REGIONS TO BE SIGNED

An initial selection of potential vector candidates for signature is made using the parameters relating to the characteristics of the video.

It has been shown that visual perception easily accommodates to changes made in moving regions. In view of this, it is useful to modify the motion vectors as these relate to moving regions. Modifications generated by the coding method are embedded in the image dynamics. Also, by carefully selecting motion vectors, visibility of these modifications can be minimised further still.

It should also be noted that this signature is distributed over the entire image concerned and is not concentrated in one region of the screen as is found with other coding systems. Also, provided that there are sufficient motion vectors, the signature is reproduced in several copies in one frame and this on each frame containing motion vectors. If the number of vectors is less than the number of bits in the signature, this is distributed over several frames. The result is that even if an extract of the video signal is used the signature can be identified.

It would also be prejudicial to the visual effect to always modify the same vectors in successive frames. Although the number of frames separating two frames containing all the image information area is generally less than 10, error accumulations induced by the signature can become visible. To offset these problems, several solutions can be implemented either individually or collectively:

select a frame containing motion vectors which precede a frame containing the entire image;

select blocks where the modification will be scarcely perceptible. For example those of which the magnitude L of the vector is comprised between some limits. This magnitude can be calculated as follows: $L0=\sup(X,Y)$ or $L1=|X|+|Y|$ or $L2=Sqrt(X*X+Y*Y)$ where Sqrt defines the square root function; and where X and Y are the coefficients of the motion vector;

select a set of vectors differing widely from one frame to another to avoid an accumulated deviation;

offset modification in the next frame, insofar as there is a vector affecting an identical block.

After selecting a set of vectors corresponding to the criteria set out above, the next step is to incorporate the key which will define the vectors to be involved in the coding. This key must not only enable a choice of vectors but also the order of their involvement at the time of coding. To this effect, all the vectors are listed and the order of their interactions with the signature has to be modulated with the key. For this, a number of motion vectors are taken at random from the selection determined previously. The random generator is initialised by the key. This initialisation can be effected by a so-called public key, common to all marked videos, or a so-called private key for unique identification of this video sequence. It is of course possible to use both keys to mark a video sequence.

Modification of Motion Vectors

Modification Method

A simple method consists in modifying the X coefficient or Y coefficient, according to the bit to be embedded by replacing the least significant bit of this coefficient. This coefficient will thus have an even value if the bit is zero or an odd value if the bit is 1.

Direct Signature

According to the method as per the invention, a digital signature is incorporated, for example a word of 32 bits in a compressed video signal. To this effect, the X or Y coefficients of the selected motion vectors are modified according to the value of the bit of the key. To ensure robust marking, 10 vectors can, for example, be selected representing block movements distributed over the entire surface of the image and modified according to the signature value. This gives us the option of incorporating 20 signature bits in the X and Y coefficients if it is decided to modify both coefficients. If the number of bits exceeds the number of coefficients likely to be marked in a given image, the signature can be distributed over several images. For example, 1 block/image can be marked and 10 images used to embed 10 bits. If the 32 bits of the signature are used, the procedure starts again from the first bit, thus ensuring greater coding security, even if the copy is only made on part of the video sequence.

Probabilistic Signature

Another technique that is much safer overcomes all the problems relating to synchronisation. This technique involves the following steps for incorporation of a signature S:

1. Select a vector according to the selection criteria described above.
2. Generate a random number A comprising the same number of bits as S using a parameter of the video to initialise the random generator. For example, the magnitude of motion vector.
3. Modify one of the coefficients X or Y to mark this coefficient with bit <<1>> if more than half of the bits of number A are identical to S, i.e. d(S, A)<d(S, NOT(A)), or otherwise with bit <<0>>, where NOT is the Boolean Negation function, d( ) is the distance defined between the signature S and the number A as: d(S,A)=Sum(Abs(i)−A(i)), Abs( ) being the absolute value function and Sum( ) the sum including all the bits of the signature.

It can be demonstrated that this algorithm enables the signature to be retrieved by statistical convergence.

This technique works irrespective of the spatial and temporal position of the blocks in the video. This means that synchronisation is no longer required between the signature bits and the selected blocks. The only consequence of deletion of parts of the image or of entire frames is a reduction in reliability of the signature retrieved and an increase in the number of frames to retrieve the signature.

Video data can be any data that are easily accessible in the video signal (value of motion vectors, DC coefficients, etc.).

FIG. 1 shows an example of implementation of the signature method as per the invention. An initial entropic decoding of the video signal (bitstream) is implemented and the motion vectors then extracted. After an initial selection in accordance with the visual criteria detailed above, a second selection dependent on the key is made. The coefficients of the vectors selected are modified by the direct method or the probabilistic method described above. Entropic coding with the new vectors enables the video signal compressed to the initial MPEG format to be obtained.

Signature in the Case of a Mixed Sequence of Inter/intra Coded Images

Clearly, in order to successfully achieve this operation, it is essential to have motion vectors. To this effect MPEG has three type of frames, type I (Intra) frames containing the image information without reference to past images, type B (Interpolated) frames and type P (Predicted) frames, the latter two types of frame containing information expressing the differences in relation to the preceding frame, and possibly containing motion vectors X and Y.

The frames of a sequence are organised in groups of pictures (GOP), each group always starting with a type I frame. A type I frame must be present in each group. In fact, if, for a given video sequence, only type B or P frames are transmitted expressing differences, this would certainly be advantageous in terms of quantity of information transmitted, but would prevent any decoding in the event of the first image not being received.

A group of pictures (GOP) generally consists of eight to ten frames. This number of frames is not dictated by the MPEG standard. However, it does not generally exceed 16 to avoid impairment to transmission reliability.

Example of groups of pictures (GOP):

| I P B B P B B P B B | I B B P B B P B B |
|---|---|
| GOP 1 | GOP 2 |

The signature identification method is based on the presence of motion vectors in the type P or B frames. As stated previously, it is these motion vectors which are modified to incorporate the signature. It may be that, in certain stages such as set-up of a video sequence, the signal only consists of type I frames and renders the signature impossible to detect momentarily, albeit still present in the video signal. On the other hand, available band width requirements for re-encoding of such a sequence for transmission on an etched support (CD) or broadcast (TV) will necessarily generate reappearance of the differential coding.

It has already been shown that the number of frames in a group of pictures (GOP) may vary depending on the compression module used. In view of this, if a compressed video signal marked in accordance with the method as per the invention is decompressed and then re-compressed with a different number of frames per group, certain frames will have completely different vectors from those present on marking.

Signal for marking with 8 frames per group:

| 1 | 2 | 3 | 4 | 5 | 6 | 7 | 8 | 9 | 10 | 11 | 12 | 13 | 14 | 15 | 16 | 17 | 18 | 19 | 20 ... |
|---|---|---|---|---|---|---|---|---|---|---|---|---|---|---|---|---|---|---|---|
| I | P | B | P | P | B | P | P | I | P | P | B | B | P | P | B | I | B | P | P |

Signal for re-compression with 10 frames per group:

| 1 | 2 | 3 | 4 | 5 | 6 | 7 | 8 | 9 | 10 | 11 | 12 | 13 | 14 | 15 | 16 | 17 | 18 | 19 | 20 ... |
|---|---|---|---|---|---|---|---|---|---|---|---|---|---|---|---|---|---|---|---|
| I | P | B | P | P | B | P | P | P | B | I | P | B | P | P | B | P | P | B | B |

It will be noted that the vectors encoded in frame 11 have disappeared as the new frame 11 is type I. This is a temporary phenomenon, however, as frame 12 will contain information of difference in relation to the preceding frame and the motion vectors will thus reappear.

The method as per the invention further offers the great advantage of enabling authentication in real time of a video signed by the method. Identification is simple as it makes direct use of the motion vectors contained in the signal.

If, contrary to expectations, the signal to be authenticated no longer contains any motion vectors, it is still possible to decompress it to obtain a conventional video signal, and then re-compress it so that to make the motion vectors reappear. Obviously in this case the possibility of identifying a signature in real time is lost.

Other Advantages of the Method

The signature or the reading of the motion vectors requires negligible computing capability compared to the coding operation or even decoding. This is due to the absence of mathematical transform as may be required with other methods (DCT, estimation of movement, etc.). This has been established experimentally with an MPEG-4 encoder. Its incorporation within coding systems thus has minimal impact on the cost price of the product. Comparison can be made with a system that cannot work directly in the compressed range. A technique of this type would require a super computer, such as Cray type, to mark a video with an insufficient throughput of 5 frames/second.

The signature only entails minimal modification to the size of the compressed video. In the case of DCT-based systems, considerably more complex procedures are involved to limit the increase in digital throughput relating to incorporation of the signature. The method as per the invention can thus be incorporated in a video transmission line such that it has not significant impact on the transmission time or rate.

Motion vectors intrinsically relate to movement in the video itself. Consequently, different alignment of the image, such as lateral displacement of two bits, cannot destroy the signature. This has been tested with shifts of a few pixels and rotation of 2 to 3 degrees.

The method is exceptionally robust under compression. This is due to the fact that compression of video images is done essentially by quantification of the DFD. If this quantification reduces the energy of the DFD, the reliability of extraction of the signature is further reinforced. (Tests show robustness to transmission rate of 1 Mbit/s, in CCIR601 10 frames/s).

What is claimed is:

1. Method for marking a compressed digital video signal including a bitstream part encoding a P-type or B-type frame by incorporating a digital signature embedded in the compressed video signal, without computing motion estimation and without computing motion compensation, the said signal representing a series of at least two video images, each of the images being divided into a plurality of regions, the said signal comprising motion vectors representing the movement of the regions between the first and second image, the method comprising the steps of:

Selection Selecting from the signal of the bitstream part encoding a P-type or B-type frame;

Entropy decoding of the bitstream;

Extracting the motion vectors;

Selecting a set of the motion vectors according to visual criterion;

Selecting a subset of said selected set of motion vectors according to a key;

Modifying at least one of the coefficient X or Y on at least one of the motion vectors of said selected set of motion vectors;

Inserting the modified motion vectors in the bitstream;

Entropy encoding of the bitstream; and

Inserting the bitstream in the video signal.

2. Method as per claim 1, characterised in that a set of motion vectors MV(i) is selected with low visual impact.

3. Method as per claim 2, characterised in that a set of vectors is selected with the magnitude below a threshold R.

4. Method as per claim 2, characterised in that the said threshold R is equal to 5.

5. Method as per claim 2, charaterised in that a set of vectors is selected from a frame preceding a frame containing all the image information (type I frame).

6. Method as per claim 2, characterised in that the set of motion vectors MV(i) is modified according to a pseudo-random selection modulated by a code.

7. Method as per claim 6, characterised in that the signature comprises a plurality of bits S(i) and in that at least one of the said coefficients X or Y of the motion vectors is modified according to at least one of the signature bits.

8. Method as per claim 7, characterised in that it further includes the following steps:

generation of a random number A initialised by a parameter issued from the video signal, comprising the same number of bits as S;

modification of one of the coeffecients X or Y such that this is signed with bit <<1>> if more than half the A bits are identical to S or with bit <<0>> if the reverse applies.

9. Method as per claim 8, characterised in that the parameter initialising the random number is a mathematical combination of the magnitude of the motion vector to be modified.

10. Method as per claim 1, characterised in that a region consists of one block.

11. Method as per claim 1, characterised in that the coefficients X or Y of the motion vectors are modified between the second and third frame in inverse proportion to the modification made between the first and second frame.

12. Method as per claim 2, characterised in that the coefficients X or Y or the motion vectors are modified between the second and third frame in inverse proportion to the modification made between the first and second frame.

13. Method as per claim 3, characterised in that the coefficients X or Y of the motion vectors are modified between the second and third frame in inverse proportion to the modification made between the first and second frame.

14. Method as per claim 4, characterised in that the coefficients X or Y or the motion vectors are modified between the second and third frame in inverse proportion to the modification made between the first and second frame.

15. Method as per claim 5, characterised in that the coefficients X or Y of the motion vectors are modified between the second and third frame in inverse proportion to the modification made between the first and second frame.

16. Method as per claim 6, characterised in that the coefficients X or Y of the motion vectors are modified between the second and third frame in inverse proportion to the modification made between the first and second frame.

17. Method as per claim 7, characterised in that the coefficients X or Y of the motion vectors are modified between the second and third frame in inverse proportion to the modification made between the first and second frame.

18. Method as per claim 8, characterised in that the coefficients X or Y of the motion vectors are modified between the second and third frame in inverse proportion to the modification made between the first and second frame.

19. Method as per claim 9, characterised in that the coefficients X or Y of the motion vectors are modified between the second and third frame in inverse proportion to the modification made between the first and second frame.

20. Method as per claim 10, characterised in that the coefficients X or Y of the motion vectors are modified between the second and third frame in inverse proportion to the modification made between the first and second frame.

21. Method as per claim 1, wherein the compressed digital video signal is obtained by an MPEG-like technique.

* * * * *